(12) United States Patent
Bradbury et al.

(10) Patent No.: US 8,048,469 B2
(45) Date of Patent: Nov. 1, 2011

(54) COCOA BEANS WITH REDUCED POLYPHENOL OXIDASE ACTIVITY AND HIGH POLYPHENOL CONTENT

(75) Inventors: Allan George William Bradbury, Turkenfeld (DE); Eva-Maria Berndt, Munich (DE)

(73) Assignee: Kraft Foods R & D, Inc., Northfield, IL (US)

( * ) Notice: Subject to any disclaimer, the term of this patent is extended or adjusted under 35 U.S.C. 154(b) by 444 days.

(21) Appl. No.: 12/137,063

(22) Filed: Jun. 11, 2008

(65) Prior Publication Data
US 2009/0041894 A1 Feb. 12, 2009

(30) Foreign Application Priority Data
Jun. 15, 2007 (EP) .................... 07011794

(51) Int. Cl.
*A23L 1/20* (2006.01)
*A23L 1/36* (2006.01)
*A23L 1/00* (2006.01)
*A23F 5/00* (2006.01)
*C07H 17/00* (2006.01)

(52) U.S. Cl. ........ 426/631; 426/629; 426/430; 426/432; 426/466; 424/776

(58) Field of Classification Search ............... 426/631, 426/629, 430, 432, 466; 424/776
See application file for complete search history.

(56) References Cited

U.S. PATENT DOCUMENTS

| | | | |
|---|---|---|---|
| 5,395,635 A | 3/1995 | Yanamoto | |
| 6,015,913 A | 1/2000 | Kealey | |

FOREIGN PATENT DOCUMENTS

| | | |
|---|---|---|
| EP | 0806147 A1 | 11/1997 |
| JP | 61195647 A | 8/1986 |
| WO | 2005/004619 A2 | 1/2005 |
| WO | 2005/115160 A1 | 12/2005 |
| WO | 2006/028360 A1 | 3/2006 |

OTHER PUBLICATIONS

Chocolate—Definition from Merriam-Webster Dictionary Apr. 29, 2011.*
EP Search Report dated Jun. 12, 2007.
Patent and Non-Patent Literature related documents, undated (73 pages).

* cited by examiner

*Primary Examiner* — Humera Sheikh
*Assistant Examiner* — Lela S Williams
(74) *Attorney, Agent, or Firm* — Fitch, Even, Tabin & Flannery

(57) ABSTRACT

The present invention relates to a process for reducing the polyphenol oxidase activity in cocoa beans comprising the step of steaming non-fermented, non-roasted raw cocoa beans with water vapor.

11 Claims, No Drawings

COCOA BEANS WITH REDUCED POLYPHENOL OXIDASE ACTIVITY AND HIGH POLYPHENOL CONTENT

FIELD OF THE INVENTION

The present invention relates to a process for reducing the polyphenol oxidase activity in cocoa beans, to cocoa beans obtainable by said process, and to the use of these cocoa beans for the manufacture of food products.

BACKGROUND

Recent studies have shown that polyphenols of cocoa beans may have beneficial effects to human health. Polyphenols can reduce the risk of chronic diseases such as cardiovascular diseases and cancers. Polyphenols and polyphenol-containing natural products such as cocoa beans could therefore be used in functional food or medicine.

Freshly harvested cocoa beans contain high levels of low molecular weight polyphenols that are oxidized into polymeric forms once the natural pod shell is opened. These polymeric polyphenols are no longer available for bio-absorption. Since there is no economically acceptable process that would avoid polyphenol polymerization caused by oxidation, there is a need to explore such processes. Most preferably, such processes would at the same time maintain other properties of natural cocoa beans.

EP 0 806 147 A1 describes a method of removing off-flavor notes from cocoa products. The method disclosed in this reference uses fermented cocoa beans that are steamed at elevated temperatures to produce acid-reduced roasted cocoa.

WO 2006/028360 A1 is directed to a method for preparing cocoa beans, which method comprises the steps of steaming roasted shelled cocoa beans, exposing them to air flow at a temperature ranging from 80-170° C. and treating said shelled cocoa beans with an oil.

JP 61195647 A describes the production of bitter chocolate, the production comprising the collection of raw cocoa beans from cocoa fruits as well as fermenting and drying cocoa beans before steaming, roasting and grinding by conventional procedures.

U.S. Pat. No. 5,395,635 reveals a method of producing white cocoa nibs. To avoid color-formation, cocoa beans of the colorless type are heated in hot water or water vapor containing an acidic, alkaline or alcoholic substance without being subjected to fermentation or after being slightly fermented. Nibs of the beans are thereby prevented from undergoing a color change.

WO 2005/004619 A2 is directed to whole roasted cocoa bean products and aims at providing an efficient manufacturing process for yielding high quality whole cocoa bean powder which has a low microbiological content.

WO 2005/115160 A1 describes a process for producing cocoa polyphenol concentrate comprising the step of blanching unfermented cocoa beans in water at a temperature in the range of from 85-100° C.

However, none of the processes described in the prior art allows to economically reduce the polyphenol oxidase activity in cocoa beans to yield cocoa beans with high polyphenol content and at the same time to maintain other natural characteristics of said cocoa beans such as polyphenol profile.

SUMMARY

Thus the present invention provides a process for reducing the polyphenol oxidase activity in non-fermented, non-roasted raw cocoa beans that is economically acceptable.

In view of the processes described in the prior art, the present inventors have developed a process for reducing the polyphenol oxidase activity in non-fermented, non-roasted raw cocoa beans, wherein the process allows to maintain the chemical profile and the content of low molecular weight polyphenols, such as, for example, thermally unstable flavonol-type polyphenols, of untreated raw cocoa beans without using acidic, alkaline or alcoholic steam additives.

In accordance with the present invention, there is provided a mild and effective process for reducing the polyphenol oxidase activity in cocoa beans comprising the step of steaming non-fermented, non-roasted raw cocoa beans with water.

The present invention is also directed to cocoa beans obtainable by the inventive process as well as products containing or derived from such cocoa beans.

DETAILED DESCRIPTION

The non-fermented, non-roasted raw cocoa beans that can be used as the substrate in the process according to the present invention can be any arbitrary non-fermented, non-roasted raw cocoa bean. Preferably, the raw cocoa beans are selected from the group comprising slaty, brown and violet cocoa beans. Such beans may, for example, be obtained from Ecuador and/or Trinidad Tobago. It is preferable that the non-fermented, non-roasted raw cocoa beans to be used according to the present invention contain a high amount of flavonoids, even more preferably flavan-3-ols and procyanidins.

According to the present invention, steaming can be carried out at a temperature of from 70-125° C. For example, the temperature can be in the range of from 75-110° C., preferably in the range of from 90-100° C. and even more preferably in the range of from 95-98° C.

Steaming in the present context implies the use of water vapor. The water vapor to be used in the steaming step according to the present invention can preferably be saturated.

While the steaming step can be conducted at slightly elevated or slightly reduced pressures, it is preferable that this step is conducted at atmospheric pressure.

Steaming can be carried out within a time interval of from 1 to 120 minutes depending on the type of equipment that is used in the steaming step. If steaming is conducted in a batch process, some time is needed for the vapor to reach all beans, whereas time could be even shorter than 1 min, if a continuous process is conducted using, e.g., a conveyer belt. Preferably, the steaming time ranges from 15-60 minutes, more preferably from 20-45 minutes.

According to the present invention, steaming can be conducted with beans obtained from cocoa pods that were depulped. Alternatively, beans can be used even without removing the pulp from the beans.

The process according to the present invention may further comprise one or more of the steps of drying, fermenting and roasting the cocoa beans. These optional steps can be carried out after the steaming step.

Drying according to the present invention can be carried out at elevated temperatures of up to 90° C. It is preferable that the beans are dried at a temperature of from 30 to 70° C. and more preferably of from 35-50° C. In order to accelerate the drying process, drying the steamed beans can be conducted under reduced pressure by any suitable means (e.g., a vacuum oven). Reduced pressure in this context means a pressure of between 200 to 950 mbar. That is, the pressure during the drying step generally can be between 200 and 500 mbar and preferably between 200 and 300 mbar.

According to the present invention, it is also possible to steam dry the beans. "Steam drying" in the context of the present invention is to be understood as treating the beans with steam that contains less water than the steam to be used in the "steaming step".

It is also possible to conduct a combined steaming and drying step in that one gradually reduces the water content of the vapor that is applied. For example, steaming the nonfermented, non-roasted raw cocoa beans can be started with saturated water vapor and the water content of the steam is then gradually reduced.

Fermentation in the context of the present invention implies conventional or short fermentation methods.

Roasting according to the present invention implies conventional procedures such as described by Minifie, Bernhard W. (Chocolate, Cocoa, And Confectionery: Science And Technology, 3rd edition, International Thomson Publishing, 1989) and Beckett, S. T. (Industrial Chocolate Manufacture and Use. Blackie & Son Ltd. 1988).

There is no specific sequence as regards the optional steps of drying, fermenting and roasting the steamed cocoa beans and one or more of these steps can be combined. That is, two or more of the steps of drying, fermenting and roasting can be carried out in a single step.

According to the present invention, the process for reducing the polyphenol oxidase activity in cocoa beans thus comprises the step of steaming non-fermented, non roasted raw cocoa beans with water vapor and further optionally comprises one or more of the steps of drying, fermenting Or roasting the cocoa beans.

In other words, there is provided a mild and effective process for reducing the polyphenol oxidase (PPO) activity in cocoa beans wherein the total polyphenol content as well as the content of low molecular weight polyphenols of the cocoa beans after steaming differ significantly from the corresponding contents of non-treated cocoa beans that have been stored after harvesting without being steam treated. "Differ significantly" in this context means that the total polyphenol content of the beans that were treated according to the present invention is preserved whereas the total polyphenol content of the non-treated beans at the time of measurement was reduced. In other words, "differ significantly" in the present context means that the total polyphenol content of the beans that were treated according to the present invention is 1.2 times or more, preferably 2.4 to 2.9 times of the total polyphenol content of the non-treated cocoa beans that have been stored after harvesting without being steam treated until the time of measurement.

"Total polyphenol content" in the context of the present invention is to be understood as the total content of polyphenolic compounds determined by Folin-Ciocalteu reaction as Gallic Acid Equivalents (GAE).

"Low molecular weight polyphenols" in the context of the present invention are procyanidins up to a degree of polymerization of eight, including monomeric flavan-3-ols as well as dimers, trimers, tetramers, pentamers, hexamers, heptamers, and octamers. Monomeric flavan-3-ols can specifically be determined via high performance liquid chromatography (HPLC).

It is preferable that the polyphenol oxidase activity, which is determined either photometrically or by using an oxygen electrode as described in the examples below, is reduced in the process according to the present invention by 50% or more, preferably 70% or more, more preferably 95% or more when compared with the polyphenol oxidase activity of freshly harvested natural non-steamed cocoa beans. Even more preferably, there is no polyphenol oxidase activity in the cocoa beans after the steaming step according to the present invention.

The process of the present invention thus aims at reducing the polyphenol oxidase activity of non-fermented, non-roasted raw cocoa beans with water vapor and thus stabilizes the content of the total polyphenols and in particular the low molecular weight polyphenols in the cocoa beans. Preferably, the total polyphenol content in the cocoa beans after steaming is in the range of from 0 to 30 g/100 g cocoa beans, more preferably of from 2 to 15 g/100 g cocoa beans, and the low molecular weight polyphenol content in the cocoa beans after steaming is in the range of from 0 to 20 g/100 g cocoa beans, more preferably of from 1 to 10 g/100 g cocoa beans and the content of monomeric Flavan-3-ols is in the range of from 0 to 5 g/100 g cocoa beans, more preferably of from 0.1 to 2.0 g/100 g cocoa beans.

After steaming, the cocoa beans obtainable by the inventive process show a reduced polyphenol oxidase activity in terms of oxygen consumption of 10 pmol or less per gram fresh weight per hour ("pmol/gfwh") as determined either photometrically or by using an oxygen electrode (see "Examples"). The term "fresh weight" in this context means the weight of the sample material as used for sample preparation. Preferably, the consumption of oxygen is reduced so that the cocoa beans do not show any polyphenol oxidase activity after the steaming treatment.

It is preferable that the content of low molecular weight polyphenols in the cocoa beans obtainable by the inventive process differs significantly from the corresponding content of non-treated cocoa beans that have been stored after harvesting without being steam treated. Preferably, the total polyphenol content of the beans that were treated according to the present invention is 1.2 times or more, preferably 2.4 to 2.9 times the total polyphenol content of the non-treated cocoa beans that have been stored after harvesting without being steam treated until the time of measurement.

The cocoa beans obtainable according to the present invention preferably have a polyphenol profile corresponding to the natural polyphenol profile of freshly harvested, non-treated raw cocoa beans. "Corresponding to" in this context means that the polyphenol profiles of treated and freshly harvested, non-treated cocoa beans do not alter significantly. This is the case for flavan-3-oles and also holds true for the low-molecular weight polyphenols as determined in the finished product (e.g., chocolate and/or confectionary products).

The present invention is also directed to the cocoa beans obtainable according to the present invention, products derived from such cocoa beans, and products containing such cocoa beans or products derived from such cocoa beans. Thus, the present invention is also directed to the use of the cocoa beans obtainable according to the process of the present invention for the manufacture of high polyphenol-containing cocoa liquors, cocoa powders, or extracts (i.e., products derived from such cocoa beans). These cocoa liquors, cocoa powders, or cocoa extracts can be used for the manufacture of a food product. For example, the cocoa liquors, cocoa powders, or cocoa extracts may be used as ingredient in the manufacture of food products, e.g., so as to adjust the polyphenol level of the food product and to provide the latter with beneficial health effects of polyphenols. Said liquors, powders, or extracts can be processed with other food ingredients commonly used in the manufacture of food products but can also be used in pure form as a filling of, e.g., confectionary products. Similarly, also the cocoa beans obtainable by the process of the present invention can be used for the manufacture of food products as outlined with regard to the cocoa liquor, cocoa powder and extract. Food product in the context of the present invention means any edible food such as a confectionary product, chocolate, or a cocoa-containing product.

EXAMPLES

The following examples are intended to illustrate the invention and not to limit it. Unless noted otherwise, all percentages and ratios in the present document are based on weight. All documents cited herein are hereby incorporated by reference.

Example 1.

Cocoa pods were obtained from Ecuador, transported under accelerated conditions via UPS (United Parcel Service, Inc.) at ambient temperatures. Beans were removed from the pods and the pulp was manually removed by rubbing the beans with tissue paper. 80 g beans thus obtained were steamed for 30 minutes at 98° C. in a steam pot (VarioklavO, H&P Labortechnik GmbH, Oberschleißheim, Germany) followed by successive drying at 40° C. in a vacuum oven (Heraeus Instruments, Vacutherm, typ. VT6060M). Another 80 g of fresh beans were used directly as a control sample after pod opening without steaming.

To determine the total polyphenol content using the Folin-Ciocalteu reaction, the polyphenols are first extracted with acetone/water/acetic acid mixture (70/29.5/0.5 by volume). The total polyphenol content of steamed beans was determined by reacting an aliquot of the extract with a phosphomolybdic/phosphotungstic acid complex (Folin-Ciocalteu reagent) in the presence of sodium carbonate to form chromogens at basic pH. The blue colored solution was measured photometrically and quantified via an external calibration with a gallic acid standard. Results are expressed as mass percent 'gallic acid equivalents' (GAE) in [g/100 g]. This method is described by Singleton et al., Methods in Enzymology (Oxidants and Antioxidants, Part A) 299,1999,152-178.

The steamed beans obtained above were analyzed according to Folin-Ciocalteu to determine the total polyphenol content. It was found that the total polyphenol content of these beans 2-24 hours after pod opening was about 5 g/100 g cocoa beans whereas non-treated beans had a total polyphenol content of only about 2 g/100 g cocoa beans 2-24 hours after pod opening.

Example 2.

Cocoa pods were obtained from Trinidad Tobago, transported under accelerated conditions via UPS (United Parcel Service, Inc.) at ambient temperatures. Five representative cocoa pods were opened and beans with pulp taken out. Two samples (three beans per sample) from each pod were immediately depulped and stored at −24° C. until analysis (control samples). All other beans were steamed over water bath for 30 minutes according to the process of this invention.

Five samples (three beans per sample) of the steamed beans were analyzed from each cocoa pod (25 samples in total) for activity of polyphenol oxidase (PPO).

Prior to analysis, samples were homogenized in phosphate buffer. PPO activity was analyzed after centrifugation in supernatant by means of an oxygen electrode using the Clarke method. When following this method, oxygen diffuses from the measuring solution through a Teflon® membrane into the electrode chamber that is formed by a central cathode, a circular anode and KCl solution. At the cathode, oxygen is reduced by direct voltage under electron consumption. This causes a current flow, the magnitude of which is directly proportional to the partial pressure of oxygen. The current is amplified and recorded as time-related oxygen consumption (Richter, G., Stoffwechselphysiologie der Pflanzen, 6. Auflage, 1998, Georg Thieme Verlag Stuttgart).

Calibration of the oxygen electrode can be carried out at 25° C. in 3 ml air-saturated phosphate buffer of pH 6.4 according to Sorensen (Tabellenbuch Chemie; VEB Deutscher Verlag für Grundstoffindustrie; 5th edition; 1968 Leipzig; page 320). Under these conditions, 0.67 pmol oxygen are dissolved in 3 ml solution (see Meyer, H., "Versuche zum Nachweis von Polyphenoloxidasen in submersen Algen", 1975, TU Braunschweig). 4-Methylcatechol can be used as standard substrate. As 4-methylcatechol is oxidized chemically by oxygen at pH 6.4, autoxidation should be determined before and after each series of measurements and should subsequently be subtracted from the data (for the oxygen electrode, see also Robinson, S. P. and Dry, I. B., "Broad bean leaf polyphenol oxidase is a 60 kD protein susceptible to proteolytic cleavage", Plant Physiol. 1992, 99, 317-323).

Alternatively, the PPO activity of beans can be determined photometrically. In this case, the reaction sample comprises 950 pl (20 mmol/l) tris-acetate buffer (pH 7.0), 20 pl 2nitro-5-thiobenzoic acid and 20 pl (100 mmol/l) caffeic acid. The reaction is started by pipeting 10 pl of the PPO containing extract and substrate conversion is detected photometrically at 412 nm over the time (see Esterbauer, H, Schwarzl, E, and Hayn, M., "A rapid assay for catechol oxidase and laccase using 2-nitro-5-thio benzoic acid", 1977, Anal. Biochem. 77, 486-494).

Oxygen usage in non-steamed beans was approximately 70-80 pmol oxygen per gram fresh weight per hour. In contrast, no PPO activity could be determined in the steamed beans using either method.

Example 3.

Use of steamed, non-fermented cocoa beans in chocolate. Cocoa pods from Trinidad Tobago (150 kg) are steam-treated at 95-100° C. for 30 minutes. After steaming, beans are dried at 35-40° C. in an air oven for up to one week to an average moisture of 5 g/100 g cocoa beans. The total weight of all batches of dried beans is 12.7 kg. The dried beans are deshelled to produce nibs and the nibs are roasted and ground to give cocoa liquor. Chocolate with 86 wt.-% cocoa solids is produced from the cocoa liquor thus obtained wherein cocoa powder from non-steamed cocoa beans is used in the chocolate production in the same amount as in conventional processes. The absolute polyphenol contribution of the cocoa powder in the chocolate is equivalent to the contribution of cocoa powder in chocolate that uses cocoa liquor from non-steamed cocoa beans. In the chocolate made of cocoa liquor from steamed beans, the contribution of low molecular weight polyphenols from cocoa powder equals 5% of the total amount of low molecular weight polyphenols. All manufacturing steps are according to conventional processes.

Chocolate samples are evaluated by tasting. The chocolate is described as less fruity and astringent, dry, having a slightly green note but not showing any off-flavor. In summary, it is found that it is possible to produce valuable chocolate from steam-treated, non-fermented cocoa beans. The chocolate thus prepared is exceptionally valuable in view of its high polyphenol content that have beneficial effects on human health.

Example 4.

Polyphenol profile of Chocolate, made from steamed, non-fermented cocoa beans. Table 1 below reveals that the profile of low molecular weight polyphenols in chocolate made from steamed, nonfermented cocoa beans corresponds to the profile of low molecular weight polyphenols in chocolate that is made from non-steamed cocoa beans. Both samples contain the same amount of cocoa powder, which was produced according to a commercial process from non-steamed cocoa beans. All ingredients, except for the cocoa liquor, are identical. Table 1 demonstrates that the profiles of the low molecular polyphenols in the two samples (i.e., control using non-steamed beans and inventive using steamed beans) are analogous.

TABLE 1

Relative data for comparison

| Sample | Relative Amounts (%) | | | | | | | | Total (monomers to octamers) |
|---|---|---|---|---|---|---|---|---|---|
| | Monomers | Dimers | Trimers | Tetramers | Pentamers | Hexamers | Heptamers | Octamers | |
| Control | 21 | 24 | 20 | 16 | 12 | 5 | 1 | 1 | 100 |
| Inventive | 24 | 19 | 20 | 16 | 13 | 6 | 1 | 1 | 100 |

The invention claimed is:

1. A process for reducing the polyphenol oxidase activity in cocoa beans comprising the step of combined steaming and drying of non-fermented, non-roasted raw cocoa beans with water vapor to provide reduced polyphenol oxidase activity cocoa beans, wherein the non-fermented, non-roasted raw beans are selected from the group comprising slaty, brown and violet cocoa beans.

2. The process according to claim 1, wherein the polyphenol oxidase activity of the reduced polyphenol oxidase activity cocoa beans is reduced by at least 50% based on the polyphenol oxidase activity of the non-fermented, non-roasted raw cocoa beans.

3. The process according to claim 1, wherein the reduced polyphenol oxidase activity cocoa beans have a total polyphenol content after the step of combined steaming and drying of at least 1 g polyphenols per 100 g of reduced polyphenol oxidase activity beans.

4. The process according to claim 2, wherein the reduced polyphenol oxidase activity cocoa beans have a total polyphenol content after the step of combined steaming and drying of at least 1 g polyphenols per 100 g of reduced polyphenol oxidase activity beans.

5. The process according to claim 1, wherein the step of combined steaming and drying is carried out at a temperature of from 70-120° C.

6. The process according to claim 2, wherein the step of combined steaming and drying is carried out at a temperature of from 70-120° C.

7. The process according to claim 3, wherein the step of combined steaming and drying is carried out at a temperature of from 70-120° C.

8. The process according to claim 4, wherein the step of combined steaming and drying is carried out at a temperature of from 70-120° C.

9. The process according to claim 3, further comprising one or more of the steps of fermenting, or roasting the reduced polyphenol oxidase activity cocoa beans after the combined steaming and drying step.

10. The process according to claim 4, further comprising one or more of the steps of fermenting, or roasting the reduced polyphenol oxidase activity cocoa beans after the combined steaming and drying step.

11. The process of claim 1, wherein during the combined steaming and drying step the water content of the vapor is reduced.

* * * * *